Sept. 10, 1968     J. F. ENGLE     3,400,611
DIFFERENTIAL MECHANISM
Filed May 6, 1966     2 Sheets-Sheet 1
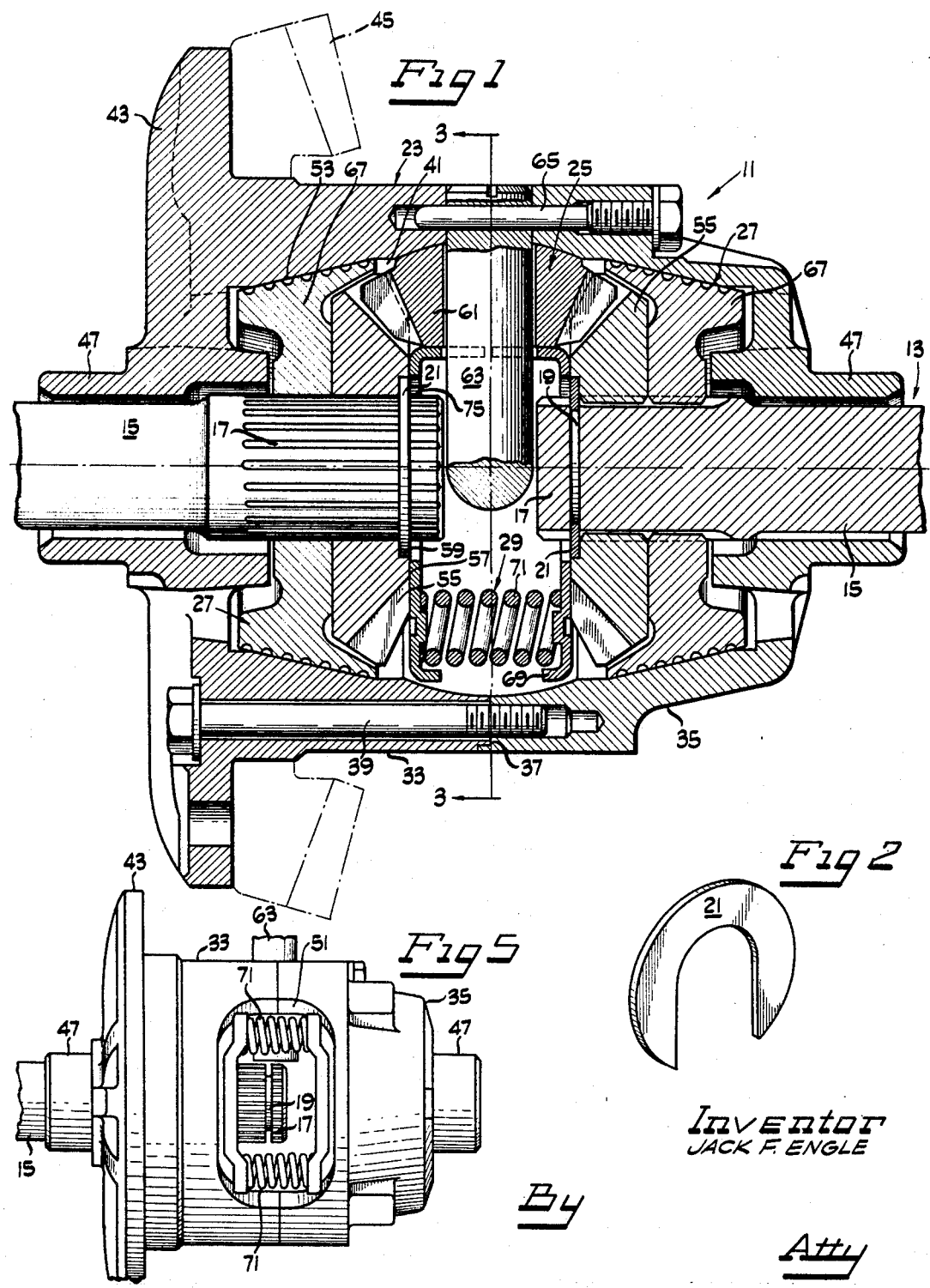
Inventor
JACK F. ENGLE
By
Atty Sept. 10, 1968    J. F. ENGLE    3,400,611
DIFFERENTIAL MECHANISM
Filed May 6, 1966    2 Sheets-Sheet 2
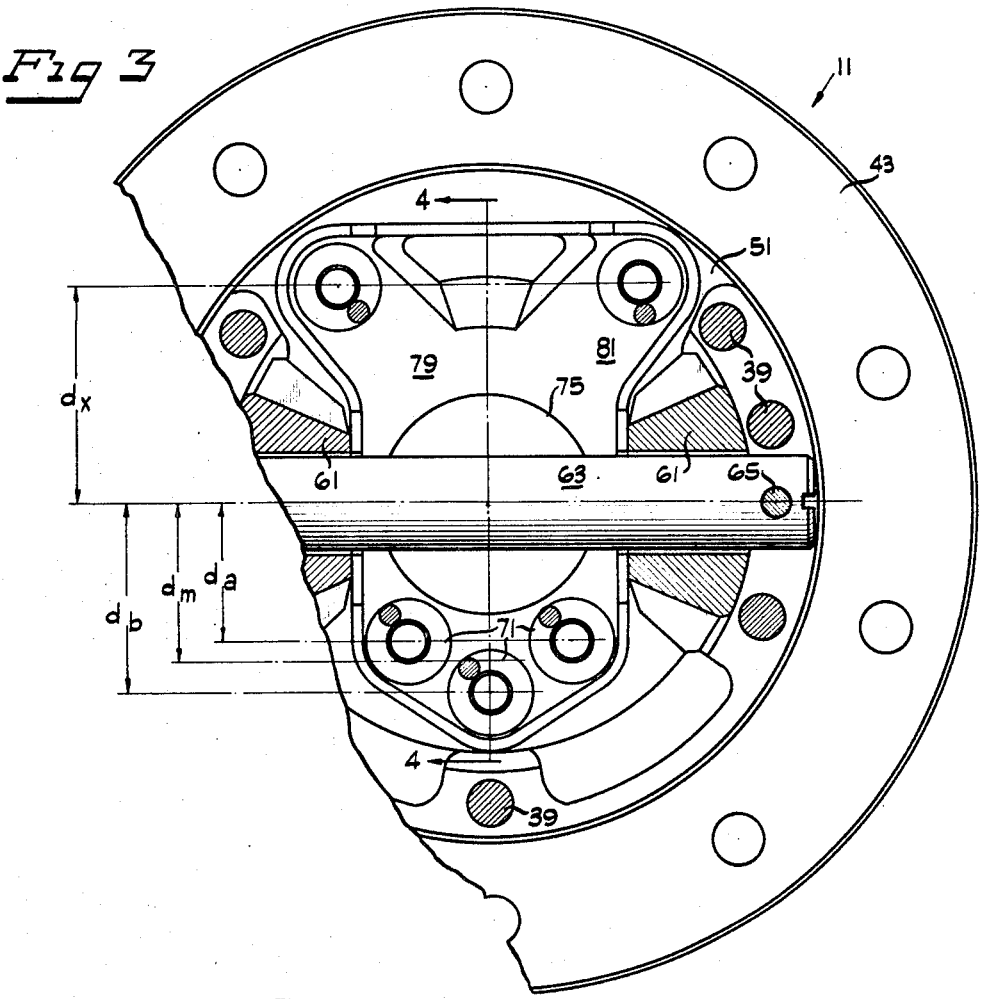
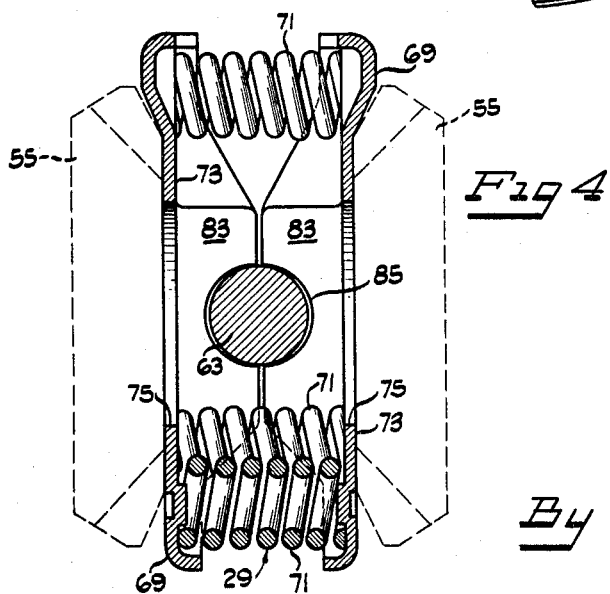
Inventor
JACK F. ENGLE
By
Atty

United States Patent Office 3,400,611
Patented Sept. 10, 1968

3,400,611
DIFFERENTIAL MECHANISM
Jack F. Engle, Auburn, Ind., assignor to Borg-Warner Corporation, Chicago, Ill., a corporation of Illinois
Filed May 6, 1966, Ser. No. 548,228
10 Claims. (Cl. 74—710.5)

ABSTRACT OF THE DISCLOSURE

A limited slip differential mechanism for use in an axle system including means within the differential mechanism for restricting outward movement of the axles. The mechanism includes biasing means urging clutch members into frictional engagement. The biasing means is insertable through a side port opening and includes springs spaced apart a sufficient distance to allow insertion of axle restraining means into the mechanism.

---

This invention relates to limited slip differential mechanisms, more particularly it relates to limited slip differential mechanisms adapted for use in an automotive axle system utilizing means disposed internally of the differential mechanism to restrict outward movement of the output shafts.

In one common form of axle arrangement utilized for the transmission of rotational effort to the driving wheels of an automotive vehicle the axial movement of the driving or output shafts is restrained by means positioned within the confines of the system differential mechanism. Normally, this is accomplished with the use of restraining members connected to adjacent spaced apart ends of the output shafts. The restraining members are sized such that they prevent movement of the output shafts outwardly of the differential mechanism by virtue of contact of the restraining members with a coacting element forming part of the differential mechanism.

Commonly the restraining members are in the form of slotted washers referred to as C washers disposed within grooves formed near the adjacent ends of the output shafts.

As can be appreciated the assembly of such an axle system requires access to the interior of the differential mechanism casing in order that the restraining members be secured to the output shafts. This problem is complicated considerably when a limited slip differential mechanism is used in the axle system because such a mechanism includes additional components which occupy areas normally providing the necessary access to the output shaft ends. Such mechanisms usually include a biasing means disposed intermediate the side gears which either operate through the side gears or independent the side gears to provide a preload upon clutch members which restrict differential action. The position of the biasing means intermediate the side gears therefore makes it impossible to secure the restraining members to the output shafts without partial disassembly of the differential mechanism, namely, removal of the biasing means.

The necessity of partial disassembly of the differential mechanism complicates the procedures used in assembling the axle sytsem and introduces time consuming delays in the assembly procedure. The biasing means usually is under substantial compressive load and includes several separate components which may readily be lost and are, at best, difficult to reassemble and reinstall.

The problem is further complicated by modern assembly plant techniques wherein components such as the differential mechanism are manufactured and assembled at one plant or one location within a plant and removed to a separate area or plant for assembly into the axle system. It is therefore most desirable to have available a limited slip differential mechanism which requires only minimal disassembly to accomplish installation into an axle system utilizing restraining means located within the differential mechanism, and it is especially desirable to have available a differential mechanism of the limited slip type which does not require removal of the biasing means for installation.

Accordingly, it is the principal object of the present invention to provide an improved form of limited slip differential mechanism adapted for use in an axle system utilizing means disposed internally of the mechanism to restrain outward movement of the output shafts.

It is another object of the present invention to provide an improved form of differential mechanism of the limited slip type which requires only minimal disassembly to accomplish installation of the mechanism into an axle system of the type described.

It is a more particular object of the present invention to provide an improved form of limited slip differential mechanism which does not require the disassembly or removal of the biasing means to accomplish installation of the differential mechanism into such an axle system.

These and other objects and advantages will become apparent with reference to the following description and the accompanying drawings.

In the drawings:

FIGURE 1 is a revolved cross sectional elevational view of a differential mechanism constructed in accordance with the principals of the present invention and illustrating various of the features thereof.

FIGURE 2 is a perspective view of a restraining means for a semi-floating axle system.

FIGURE 3 is a sectional view of the apparatus of FIGURE 1 taken generally along the line 3—3 of FIGURE 1.

FIGURE 4 is a sectional view of a portion of the apparatus of FIGURE 1 taken generally along the line 4—4 of FIGURE 1.

FIGURE 5 is an elevational view on a reduced scale of the mechanism shown in FIGURE 1 and illustrating an important feature of the invention.

Very generally, the present invention is directed to an improved form of limited slip differential mechanism adapted for use in an axle system including means within the differential mechanism for restraining axial outward movement of the output shafts of the system. The limited slip differential mechanism of the present invention includes clutch members associated with the output shafts which frictionally engage the mechanism casing to restrict differential action. Biasing means are provided internally of the mechanism which preload the clutches to provide an initial, minimum resistance to differential action. The biasing means is constructed such that access may be had to the interior of the differential mechanism casing to secure restraining members to the system output shafts without the necessity of removal or disassembly of the biasing means.

Referring now to the drawing and more specifically to FIGURE 1 there is shown an embodiment of a differential mechanism generally designated 11 which is illustrative of the present invention. In FIGURE 1 the differential mechanism 11 is shown in operative association with an axle system 13 of a vehicle. The axle system 13 includes a pair of co-axially aligned output shafts 15 which terminate in splined ends 17 disposed interiorly of the mechanism 11 in juxtaposed spaced apart relation. Each splined end 17 includes a groove 19 formed near the inner end of the shafts. A restraining member in the form of a generally flat, split washer 21 shown in greatest detail in FIGURE 2 is disposed in each of the grooves 19. This washer, called a C washer is effective to prevent axial movement of the output shafts 15 outwardly of the mechanism 11 as will be explained.

The differential mechanism 11 includes a casing 23 adapted to receive rotational effort from the drive line (not shown) of a vehicle for transmission to the output shafts 15 of the axle system. A bevel gear system 25 is disposed interiorly of the casing and is operatively connected between the casing and the output shafts 15 to transmit rotational effort to the shafts and simultaneously allow relative movement between shafts when necessary, as when the vehicle is cornering.

A pair of clutches 27 are also positioned within the casing 23 each one of which is operatively associated with the casing and one output shaft 15 to resist free differential action. A biasing means 29 is disposed within the casing and is operatively associated with the clutches 27 to urge them into a predetermined frictional engagement to provide an initial resistance to differentiation.

More specifically, and as best seen in FIGURES 1 and 3 the casing 23 of the differential mechanism of the illustrated embodiment of the invention includes a pair of cup shaped sections 33 and 35. These sections include mating ends 37 which are retained in abutting relation by bolts 39 to define an internal cavity 41.

One of the sections 33 of casing 23 includes a peripheral flange 43 to which is secured a ring gear 45 (shown in phantom lines) adapted to receive rotational effort from the vehicle drive line.

Each of the casing sections 33 and 35 includes a shaft opening defined by a hub 47. The output shafts 15 extend inwardly through the openings defined by the hubs 47 into the interior of the cavity 41.

A side port 51 best seen in FIGURES 3 and 5, is provided in the longitudinal wall of the casing 23 defined by the cup shaped sections 33 and 35 which is formed by mating rectangular openings provided in the sections 33 and 35 at the mating ends 37. The side port opening provides necessary access to the interior cavity 41 of the casing for assembly of the mechanism into the axle system.

It should be noted, that although the casing 23 is shown as being constructed of two separate sections, it is also possible to utilize a casing formed of a single cast element. In this instance the side port 51 is also used for insertion of the bevel gear system 25 and clutches 27.

Referring again to FIGURE 1, each of the sections 33 and 35 are further provided with a generally frusto-conically shaped surface within the cavity 41 forming a pair of spaced apart truncated cone shaped drums 53 concentrically disposed with respect to the longitudinal center-line of the shafts 15. The drums are formed such that the conical surfaces converge toward the hubs 47, that is, axially away from the mating ends 37 of the sections 33 and 35.

As best seen in FIGURE 1 the bevel gear system 25 includes a pair of side gears 55 each of which is connected to one of the splined ends 17 of the output shafts 15. Each gear therefore is rotatable with, and slidable axially with respect to one of the output shafts.

Each side gear includes the transverse inner face 57 disposed in spaced apart facing relation to the corresponding transverse inner face of the other side gear. The transverse inner face 57 of each side gear is provided with a recess 59 in the form of a counter bore adjacent the output shaft 15. Each recess 59 is sized to receive one of the C washers 21 and serves to restrain outward movement of the output shafts 15.

The bevel gear system 25 further includes a pair of pinion gears 61 rotatably supported by a transversely extending pinion shaft 63. These gears are equidistant from the longitudinal center-line of the output shafts 15 in intermeshing engagement with the side gears 55. The pinion shaft 63 extends transversely of the differential casing 23 between the ends of the shafts 15 and is secured to the casing by a removable, partially threaded dowel pin 65. The pinion shaft diameter is sized to restrain inward movement of the output shafts 15.

Rotational effort received by the differential mechanism 11 is transferred through the pinion shafts 63 and pinion gears 61 to the output shafts 15 in a well-known manner. Additionally, when relative rotation between the output shafts is required, the bevel gear system 25 provides the necessary system flexibility.

Free differentiation between the output shafts 15 is restrained by the clutches 27 of the differential mechanism. As best seen in FIGURE 1 the clutches 27 include a pair of truncated cone shaped clutch members 67 disposed for frictional engagement with the conically shaped drums 53 formed on the interior of the differential casing 23. Each cone shaped clutch member is provided with a splined inner bore which engages the splined end 17 of one of the output shafts 15. the clutch is therefore rotatable with and axially moveable with respect to the output shaft 15 to which it is connected.

The clutch members are disposed intermediate the side gears 55 and the hubs 47 of the casing and are in transverse abutting contact with the adjacent side gears 55.

Though the clutch member 67 and side gear 55 associated with each shaft is shown as a separate component, these elements may be integrally formed as a single component. Further it is obvious that it is not essential to the principles of the invention that conical clutches be utilized and that disc type clutches may be substituted without departing from the scope of the invention.

Resistance to rotational effort is accomplished in a well-known manner. Transmission of torque from the pinion gears 61 to the side gears 55 creates separating forces urging the side gears axially outwardly in a direction away from the pinion shaft 63. These forces are transferred to the cone shaped clutch member 67 which in turn frictionally engage the drum surfaces 53 of the casing 23 to provide a direct path for transmission of rotational effort to the output shaft 15 to which the clutch member 67 is connected.

As is well known, it is advantageous to provide an initial preload upon the clutch members 67 to urge them into frictional engagement with the conically shaped drums 53. An initial resistance to free differentiation is established in the differential mechanism which resistance is increased by the axial forces applied to the clutch members by the side gears upon increased application of torque to the mechanism casing.

As seen in FIGURES 1, 3 and 4 the initial preload of the clutch members 67 is provided by the biasing means generally designated 29.

In accordance with the present invention, the biasing means 29 includes a pair of spaced apart plates 69 between which are disposed a plurality of compression coil springs 71. The plates 69 include transverse walls 73 which are in abutting contact with side gears 55 and transfer the axial load of the springs 71, which are in a compressed condition, to the clutch members 67 through the side gears 55.

Each plate 69 includes an aperture 75 formed in the transverse wall 73 in alignment with the recess 59 of the adjacent side gear 55 in concentric relation to the output shaft 15. The diameter of the apertures 75 is at least as large, and preferably slightly larger than the diameter of the recess 59 to allow free movement of the C washer of each shaft into position within the recess 59.

Referring now to FIGURE 3, the transverse walls 73 include straight portions 79 and flared portions 81. This configuration allows for the insertion and removal of the biasing means 29 into position between the side gears 55 through the side port opening 51.

The straight portions 79 which are appropriately sized to pass between the pinion gears 61 are provided with inwardly directed side walls 83 shown in FIGURE 4. The side walls include appropriately formed generally semi-circular apertures 85 which surround the pinion shaft 63. These apertures receive the pinion pin and serve to properly locate the biasing means 29 within the cavity 41 and additionally serve to retain the biasing means within the cavity after assembly and also cause it to rotate with the pinion shaft about the output shaft center-line.

The compression springs which provide an axial force upon the clutch members 67 are positioned in clusters adjacent opposite ends of the plates 69. In the illustrated embodiment a group of three springs is positioned to act upon the straight portions 79 of the transverse walls and two springs are positioned to act upon the flared portions 81.

The two springs acting upon the flared portions 81 are spaced apart laterally a distance sufficient to allow insertion of a restraining means such as the C washer 21 into the cavity 41 without the necessity of removal of the biasing means from its position within the mechanism 11. Since the flared portions 79 of the transverse wall 73 are disposed adjacent the side port 51 of the casing, the C washers 21 may readily be inserted into the mechanism for assembly of the differential mechanism into the axle system.

It is contemplated in the illustrated embodiment that each of the springs 71 be of equal size and spring rate, except for variations within manufacturing limits. As it is desirable to have the uniform loading to the clutch members 67, the springs 71 are arranged such that the moment center of the biasing means is in alignment with the longitudinal center-line of the output shaft. To this end, the springs acting on the flared portions 81 of the plates 69 are disposed a projected distance $d_x$ (referring to FIGURE 3) from the center-line of the output shafts which distance is equal to three-halves the distance $d_m$ which represents the mean projected distance from the output shaft center-line to the springs acting on the straight portions 79. The mean diameter $d_m$ is equal to the distance $d_a$ at which distance two of the springs acting upon the straight portions 79 are disposed plus one-third of the difference between the distance $d_a$ and the distance $d_b$ at which distance one spring is acting upon the straight portions.

It should be noted that the arrangement described is merely illustrative. It is possible to use springs of unequal size and spring rate to accomplish the same result, that is, uniform axial loading of clutch members 67.

With the embodiment described, it is possible to completely assemble the differential mechanism 11 and thereafter install the mechanism into an axle system with only a minimal disassembly of the components and without the necessity of removal of the biasing means 29.

To install the differential mechanism 11 into an axle system the pinion shaft 63 is removed from its position within the casing 23 by removal of the partially threaded dowel pin 65. This provides an open area in the center of the cavity 41. As the biasing means 29 imparts a substantial axial load upon the side gears 55 and clutch members 67 and the pinion gears 61 are engaged with the side gears 55 these components remain in their previously assembled positions.

An output shaft 15 is then inserted through one of the hubs 47 and is positioned so that the groove 19 in the splined end of the shaft is aligned with the area previously occupied by the pinion shaft. (Refer to FIGURE 5.) Since the two springs 71 acting upon the flared portions 81 are spaced apart a distance sufficient to allow insertion of the restraining member 21 into the cavity 41 and since this opening is aligned with the side port 51 the restraining member may be passed between these springs and positioned within the groove 19. The output shaft 15 is then moved axially outwardly until the restraining member 21 is positioned within the recess 59 of the respective side gear 55.

The same steps are performed upon the other output shaft 15 and the pinion shaft 63 is then positioned in the casing 23 and secured to the casing by the dowel pin 65.

The output shafts are thereby properly secured to the differential mechanism with axial outward movement of the shafts being restrained by engagement of the restraining member or C washers with the side gears 55 and axial inward movement being restrained by contact of the output shaft ends with the outer diameter of the pinion shaft 63.

As can be seen a differential mechanism has been provided which is readily adapted for use in an axle system using output restraining means disposed within the differential mechanism, and which allows necessary access to the interior of the mechanism casing for connection of the output shaft restraining members to the output shafts without complicated and time consuming partial disassembly of differential mechanism components which are under substituted compressive loads.

Various of the features of the invention have been particularly shown and described, however, it should be obvious to one skilled in the art that various modifications may be made therein without departing from the scope of the invention.

I claim:

1. A limited slip differential mechanism for an axle system having a pair of co-axially aligned, relatively rotatable output shafts including spaced apart juxtaposed ends and restraining means connected to each shaft adjacent the ends to prevent movement of each shaft in a direction away from the other thereof, said mechanism comprising: a differential casing including a pair of apertures adapted to receive the output shafts and defining an internal cavity surrounding said juxtaposed ends, said casing including a side port providing access to said cavity; a bevel gear system disposed within said cavity and adapted to be connected to the output shafts to transfer rotational effort thereto; at least one clutch disposed within said cavity and adapted to be connected to said shafts to resist differential action; and biasing means disposed within said cavity and formed to be insertable through said side port opening including a pair of spaced apart plates operatively associated with said clutch and a plurality of springs interposed between said plates and urging said plates in a direction effecting frictional engagement of said clutch; at least two of said springs being spaced apart a distance sufficient to allow passage therebetween of the restraining means for connection to the output shafts; said biasing means being disposed in said cavity such that said space between said two of said springs is exposed at said side port.

2. A limited lip differential mechanism as claimed in claim 1 wherein said springs of said biasing means comprise compression coil springs.

3. A limited slip differential mechanism as claimed in claim 2 wherein each said plate of said biasing means includes a transverse wall having a straight portion and a flared portion; said springs are disposed intermediate said transverse walls and urge each wall in a direction away from the other of said walls, with said spaced apart springs acting upon said flared portions of said transverse walls, and said biasing means is disposed in said casing with said flared portions of said plates adjacent said side port.

4. A limited slip differential mechanism as claimed in claim 3 wherein a first cluster of springs acts upon said straight portions of said transverse walls in spaced relation to the centerline of said shaft receiving apertures of said casing and a second cluster of springs including said spaced apart springs acts upon said flared portions of said transverse walls in spaced relation to said centerline, said springs being arranged such that a moment center of the spring clusters acting on said straight and flared portions is established that passes through the centerline of said shaft receiving apertures.

5. A limited slip differential mechanism as claimed in claim 4 wherein said first cluster of springs includes three springs and said second cluster of springs includes said two springs spaced apart a distance sufficient to allow passage therebetween of the restraining means, said springs of said second cluster being disposed a projected distance from said center-line of said shaft receiving apertures equal to three-halves of the mean projected distance between said center-line and said three springs of said first cluster.

6. A limited slip differential mechanism as claimed in claim 3 wherein said bevel gear system includes a pair of spaced apart side gears, each said side gear being adapted to be connected to one of the output shafts for rotation therewith and axial movement with respect thereto, and said biasing means is disposed intermediate said side gears with said straight portions of each one of said transverse walls being in contact with one of said side gears.

7. A limited slip differential mechanism as claimed in claim 6 wherein said bevel gear system includes a removable pinion shaft extending transversely of said cavity and is adapted to be disposed intermediate the spaced apart ends of the output shafts, said removable pinion shaft having a diameter approximately equal to the distance between the ends of the shafts when said shafts are at their outermost position as determined by said restraining means, and wherein contact of the ends of the shafts with said pinion shaft prevents movement of each shaft in a direction toward the other of the shafts.

8. A limited slip differential mechanism as claimed in claim 7 wherein said plates of said biasing means include parallel side walls extending from said straight portions of said transverse walls, said parallel side walls of each said plate extending toward the parallel side walls of the other side of said plates, each said side wall including an aperture formed in mating relation with the aperture of the adjacent side wall of the other of said plates, and wherein said pinion shaft of said mechanism extends intermediate said plates through said apertures, said pin preventing removal of said plates from said casing.

9. A limited slip differential mechanism as claimed in claim 6 wherein each said side gear is provided with a recess formed concentrically of the center-line of said shaft receiving apertures of said casing, each said recess being adapted to receive the restraining member connected to one of the output shafts, and contact of the restraining member with said side gear in said recess prevents outward movement of the output shaft.

10. A limited slip differential mechanism as claimed in claim 9 wherein said mechanism is adapted to be connected to a pair of output shafts including a groove adjacent the juxtaposed ends and the restraining means includes a slotted washer disposed within the groove adapted to engage said side gear of said bevel gear system within said recess to prevent axial movement of the shaft outwardly of said mechanism, said recess being sized to receive said washer and to retain said washer in the slot of the shaft, and wherein said straight portions of said transverse walls of said biasing means include apertures having a diameter larger than said washer to allow passage of said washer therethrough to said recess.

References Cited

UNITED STATES PATENTS

| | | | |
|---|---|---|---|
| 3,097,545 | 7/1963 | Immel | 74—711 |
| 3,186,258 | 6/1956 | Meldola | 74—710.5 |
| 3,224,299 | 12/1965 | Holdeman et al. | 74—711 |
| 3,233,477 | 2/1966 | O'Brien | 74—710.5 |
| 3,320,063 | 6/1967 | Mazziotti | 74—711 |

FRED C. MATTERN, JR., *Primary Examiner.*

ARTHUR T. McKEON *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,400,611             September 10, 1968

Jack F. Engle

It is certified that error appears in the above identified patent and that said Letters Patent are hereby corrected as shown below:

Column 7, line 34, cancel "side", first occurrence.

Signed and sealed this 16th day of December 1969.

(SEAL)
Attest:

Edward M. Fletcher, Jr.             WILLIAM E. SCHUYLER, JR.
Attesting Officer                     Commissioner of Patents